(12) United States Patent
Yao et al.

(10) Patent No.: US 7,199,978 B2
(45) Date of Patent: Apr. 3, 2007

(54) METHOD AND APPARATUS FOR CONNECTING A MICRO-ACTUATOR TO DRIVER ARM SUSPENSION

(75) Inventors: Ming Gao Yao, Dongguan (CN); Masashi Shiraishi, Kowloon (HK)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 191 days.

(21) Appl. No.: 10/645,259

(22) Filed: Aug. 20, 2003

(65) Prior Publication Data

US 2004/0095684 A1 May 20, 2004

(30) Foreign Application Priority Data

Nov. 19, 2002 (WO) .................... PCT/CN02/00826

(51) Int. Cl.
 *G11B 5/596* (2006.01)
(52) U.S. Cl. .................... 360/234.6; 360/294.4
(58) Field of Classification Search ............ 360/245.2, 360/294.4, 234.6, 294.1, 294.3, 294
See application file for complete search history.

(56) References Cited

U.S. PATENT DOCUMENTS

| | | | | |
|---|---|---|---|---|
| 5,086,966 | A * | 2/1992 | Melton et al. .............. 228/208 |
| 6,198,606 | B1 | 3/2001 | Boutaghou et al. ...... 360/294.3 |
| 6,341,415 | B2 | 1/2002 | Amemiya et al. ........ 29/603.06 |
| 6,349,017 | B1 | 2/2002 | Schott ...................... 360/234.6 |
| 6,467,141 | B2 * | 10/2002 | Okada et al. .............. 29/25.35 |
| 6,584,708 | B2 * | 7/2003 | Yun et al. ................... 310/324 |
| 6,653,761 | B2 * | 11/2003 | Fujii et al. .................. 310/333 |
| 6,717,772 | B2 * | 4/2004 | Otsuka et al. ........... 360/235.1 |
| 6,735,055 | B1 * | 5/2004 | Crane et al. ............. 360/294.6 |
| 6,848,154 | B2 * | 2/2005 | Fujii et al. ................. 29/25.35 |
| 2003/0196315 | A1 * | 10/2003 | Yao et al. ................ 29/603.06 |
| 2003/0231434 | A1 * | 12/2003 | Mita et al. ............... 360/294.4 |
| 2005/0104477 | A1 * | 5/2005 | Fujii et al. .................. 310/328 |
| 2005/0105203 | A1 * | 5/2005 | Zhu et al. ..................... 360/75 |

FOREIGN PATENT DOCUMENTS

| | | | |
|---|---|---|---|
| CN | 1233054 | A | 10/1999 |
| CN | 1257273 | A | 6/2000 |
| CN | 1264124 | A | 8/2000 |
| CN | 1347078 | A | 5/2002 |
| CN | 1378685 | T | 11/2002 |
| JP | 2004-22087 | A * | 1/2004 |

* cited by examiner

*Primary Examiner*—Jefferson Evans
(74) *Attorney, Agent, or Firm*—Kenyon & Kenyon LLP

(57) ABSTRACT

A system and method for connecting an actuator to a suspension element is disclosed. The actuator is electrically coupled using a silver paste. The silver paste is further covered by a coating application to provide structural support. A step, attached to either the actuator base or the suspension tongue, provides further structural support and maintains a gap between the actuator and the suspension element.

42 Claims, 7 Drawing Sheets

METHOD AND APPARATUS FOR CONNECTING A MICRO-ACTUATOR TO DRIVER ARM SUSPENSION

BACKGROUND INFORMATION

The present invention relates to magnetic hard disk drives. More specifically, the present invention relates to a method of connecting the micro-actuator to the driver arm suspension.

In the art today, different methods are utilized to improve recording density of hard disk drives. FIG. 1 provides an illustration of a typical drive arm configured to read from and write to a magnetic hard disk. Typically, voice-coil motors (VCM) 102 are used for controlling a hard drive's arm 104 motion across a magnetic hard disk 106. Because of the inherent tolerance (dynamic play) that exists in the placement of a recording head 108 by a VCM 102 alone, micro-actuators 110 are now being utilized to 'fine-tune' head 108 placement. A VCM 102 is utilized for course adjustment and the micro-actuator then corrects the placement on a much smaller scale to compensate for the VCM's 102 (with the arm 104) tolerance. This enables a smaller recordable track width, increasing the 'tracks per inch' (TPI) value of the hard drive (increased drive density).

FIG. 2 provides an illustration of a micro-actuator as used in the art. Typically, a slider 202 (containing a read/write magnetic head; not shown) is utilized for maintaining a prescribed flying height above the disk surface 106 (See FIG. 1). Micro-actuators may have flexible beams 204 connecting a support device 206 to a slider containment unit 208 enabling slider 202 motion independent of the drive arm 104 (See FIG. 1). An electromagnetic assembly or an electromagnetic/ferromagnetic assembly (not shown) may be utilized to provide minute adjustments in orientation/location of the slider/head 202 with respect to the arm 104 (See FIG. 1).

The physical and electrical coupling of a hard disk micro-actuator and magnetic head to a drive arm suspension can be difficult due to the environment within which it must operate. Using silver paste (high mercury-content epoxy) for physical/electrical attachment has drawbacks due to the viscous nature of epoxy under changing temperature and humidity. Under certain temperature and humidity conditions, the epoxy can deform, affecting the position of the slider and micro-actuator in relation to the suspension arm. Additionally, silver ions or silver atoms in the silver paste may begin to migrate from the epoxy to the micro-actuator, affecting the performance of the micro-actuator. While other options for bonding the actuator to the suspension arm exist, such as gold ball bonding (GBB) and solder bump bonding (SBB), the rigidity of these options can lead to greater damage. In particular, the thinness of the piezoelectric transducer (PZT) surface layer of the micro-actuator can reduce the peel strength between the PZT layer and the bonding pad, causing the connection to crack and create an electrical short between the two. It is therefore desirable to support the micro-actuator and connect it to the suspension arm using a method that can create strong a connection without the risks of deformation.

DETAILED DESCRIPTION

A system and method for connecting an actuator to a suspension element is disclosed. The actuator is electrically coupled using a silver paste. The silver paste is further covered by a coating application to provide structural support. A step, attached to either the actuator base or the suspension tongue, provides further structural support and maintains a gap between the actuator and the suspension element.

Figure 1:
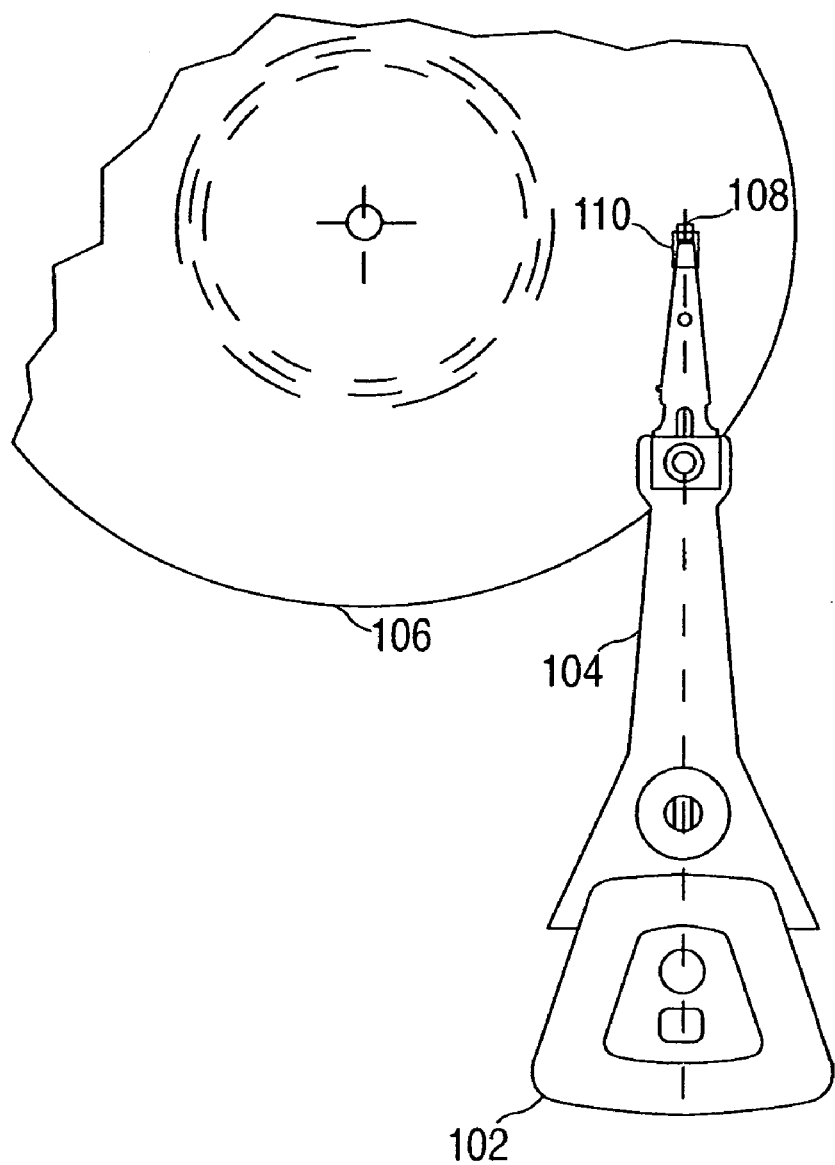
FIG. 1 provides an illustration of a drive arm configured to read from and write to a magnetic hard disk as used in the art.
Figure 2:
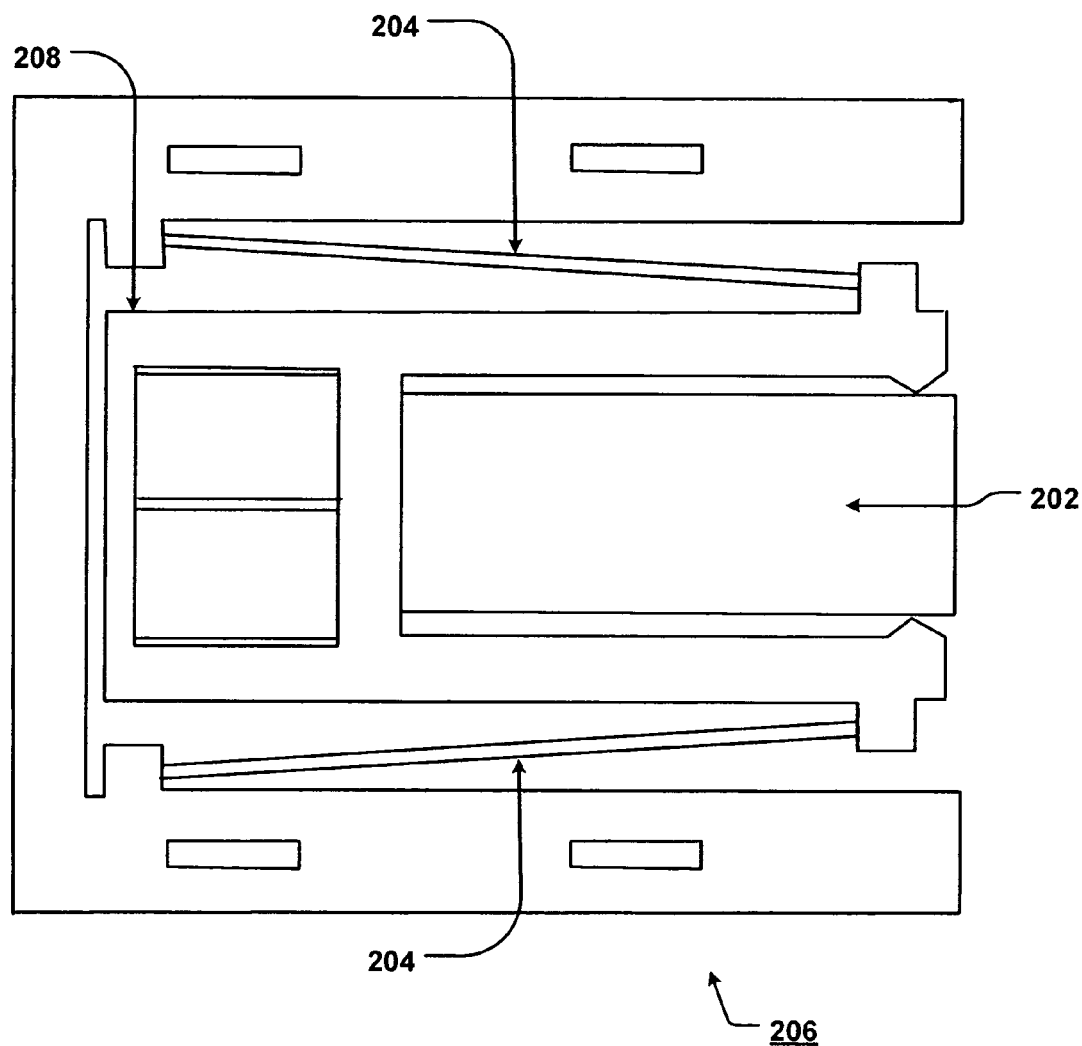
FIG. 2 provides an illustration of a micro-actuator as used in the art.
Figure 3:
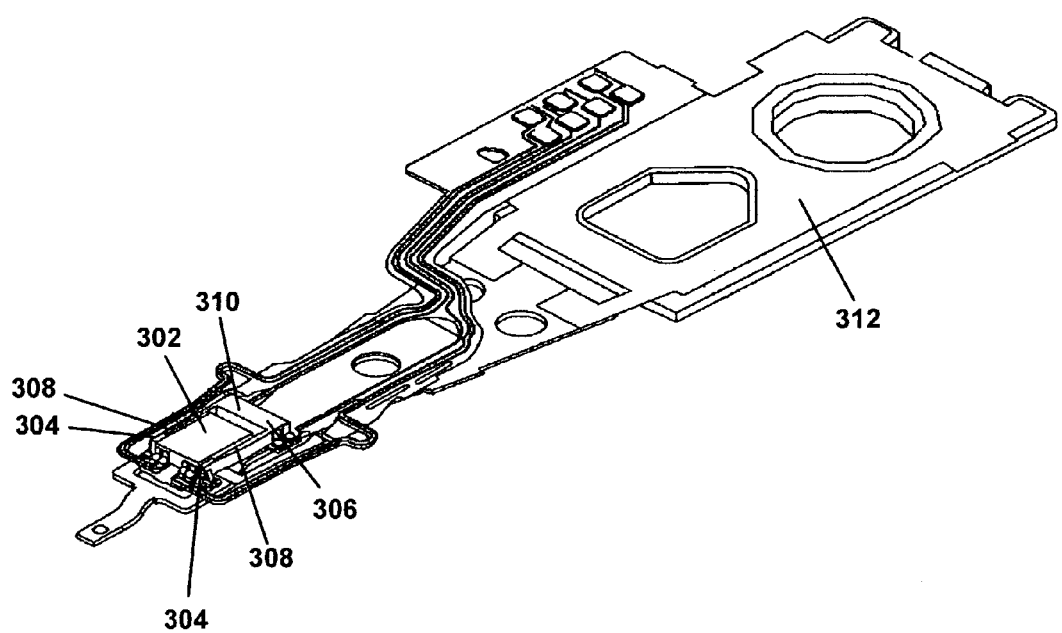
FIG. 3 describes a hard disk drive head gimbal assembly (HGA) with a 'U'-shaped micro-actuator according to an embodiment of the present invention.

Illustrated in an upside-down orientation, FIG. 3 describes one embodiment of a hard disk drive head gimbal assembly (HGA) with a 'U'-shaped micro-actuator. In this embodiment, a slider 302 is bonded at two points 304 to a 'U'-shaped micro-actuator 306. In a further embodiment, the 'U'-shaped micro-actuator has a piezoelectric Lead Zirconate Titanate (PZT) beam (arm) 308 on each side of a ceramic support frame (actuator base) 310. The micro-actuator 306 is coupled to a suspension 312.

Figure 4:
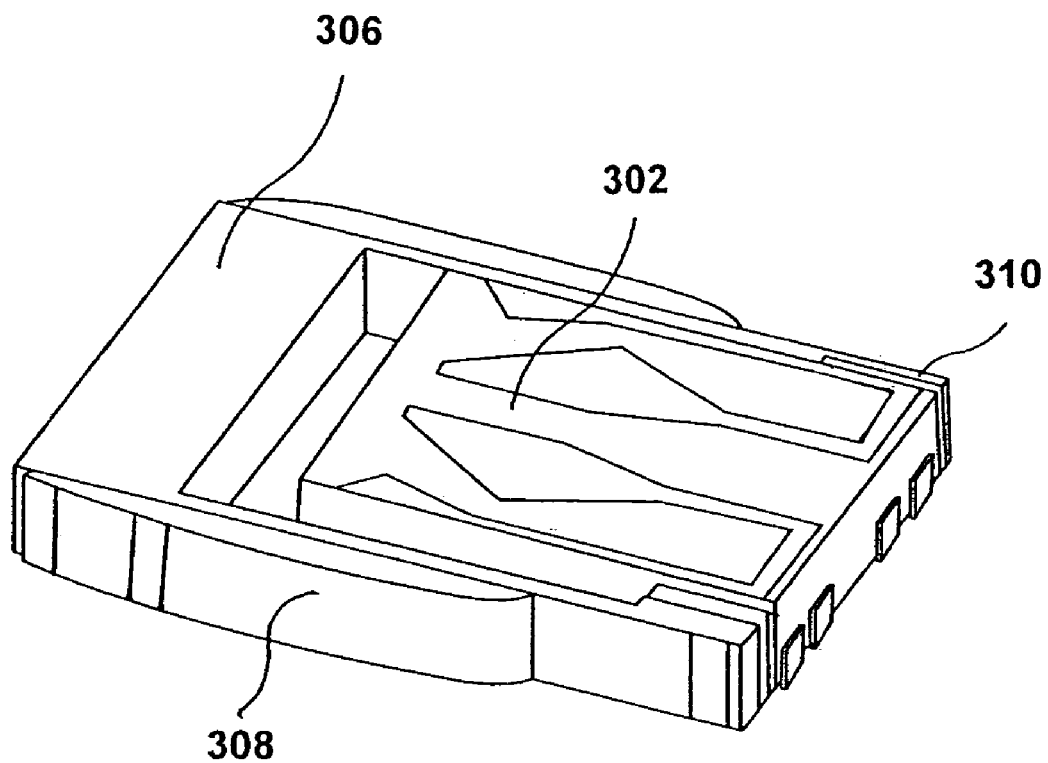
FIG. 4 provides an illustration of a U shape micro-actuator design according to an embodiment of the present invention.

FIG. 4 illustrates one embodiment of the 'U' shaped micro-actuator 306. A support frame 310 supports two piezoelectric Lead Zirconate Titanate (PZT) beams 308. In one embodiment, the support frame is ceramic. The 'U' shaped micro-actuator 306 is connected to the slider element 302. In one embodiment, the micro-actuator may be a piezoelectric micro-actuator, an electromagnetic micro-actuator, an electrostatic micro-actuator, a capacitive micro-actuator, a fluidic micro-actuator, or a thermal micro-actuator.

Figure 5:
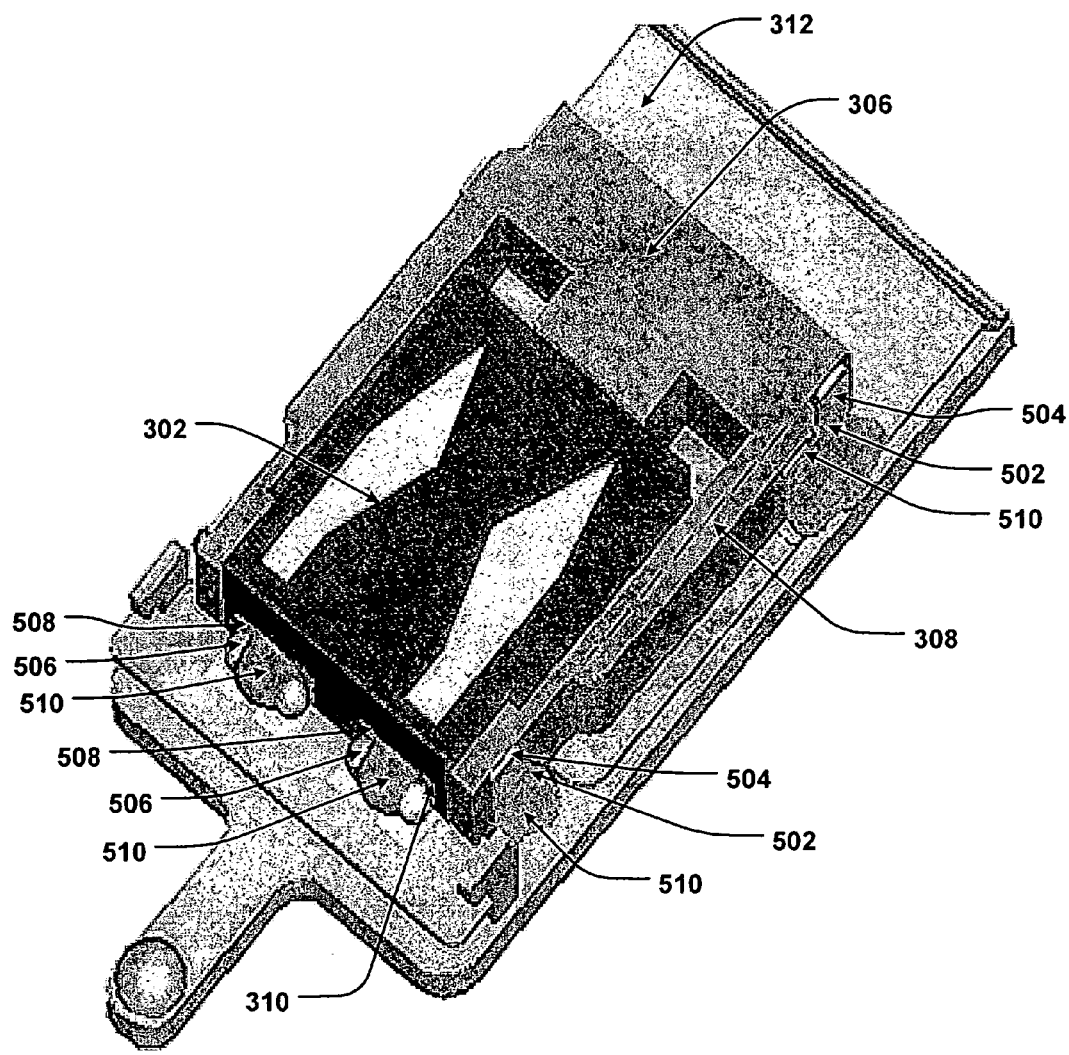
FIG. 5 provides an illustration of the configuration of the coating application according to an embodiment of the present invention.

FIG. 5 illustrates the coupling of the 'U' shaped micro-actuator 306 to the suspension element 312. In one embodiment, the 'U' shaped micro-actuator 306 is electrically coupled 502 to the suspension bonding pads 504 using a silver epoxy paste or resin. In a further embodiment, the slider 302 is electrically coupled 506 to the suspension bonding pads 508 using a silver epoxy paste or resin. In one embodiment, a coating application 510 covering the electric couplings for the micro-actuator 502 and the slider 506 provides physical support for these electric couplings. In particular, the coating application provides physical support for these electric couplings for the actuator element that can have movement independent of the movement of the HGA. In one embodiment, the coating application has a high glass transition temperature (Tg) (e.g., Tg>120 degree Celsius), the temperature at which glassy solids transition to more flexible rubbery solids. In a further embodiment, the coating application has a high Young's modulus (E) (e.g., E>0.6 G Pa), the measure of the stiffness of a material. In one embodiment, the coating application is an epoxy or a resin. The epoxy coating application can contain a filler material, such as metal, glass or a fiber material. The coating application protects the electric coupling from deformations caused by changes in humidity and temperature, as well as physical strain over time. The coating application can also prevent the migration of silver ions or atoms from the electric coupling into the electric layer of the PZT of the micro-actuator.

Figure 6:
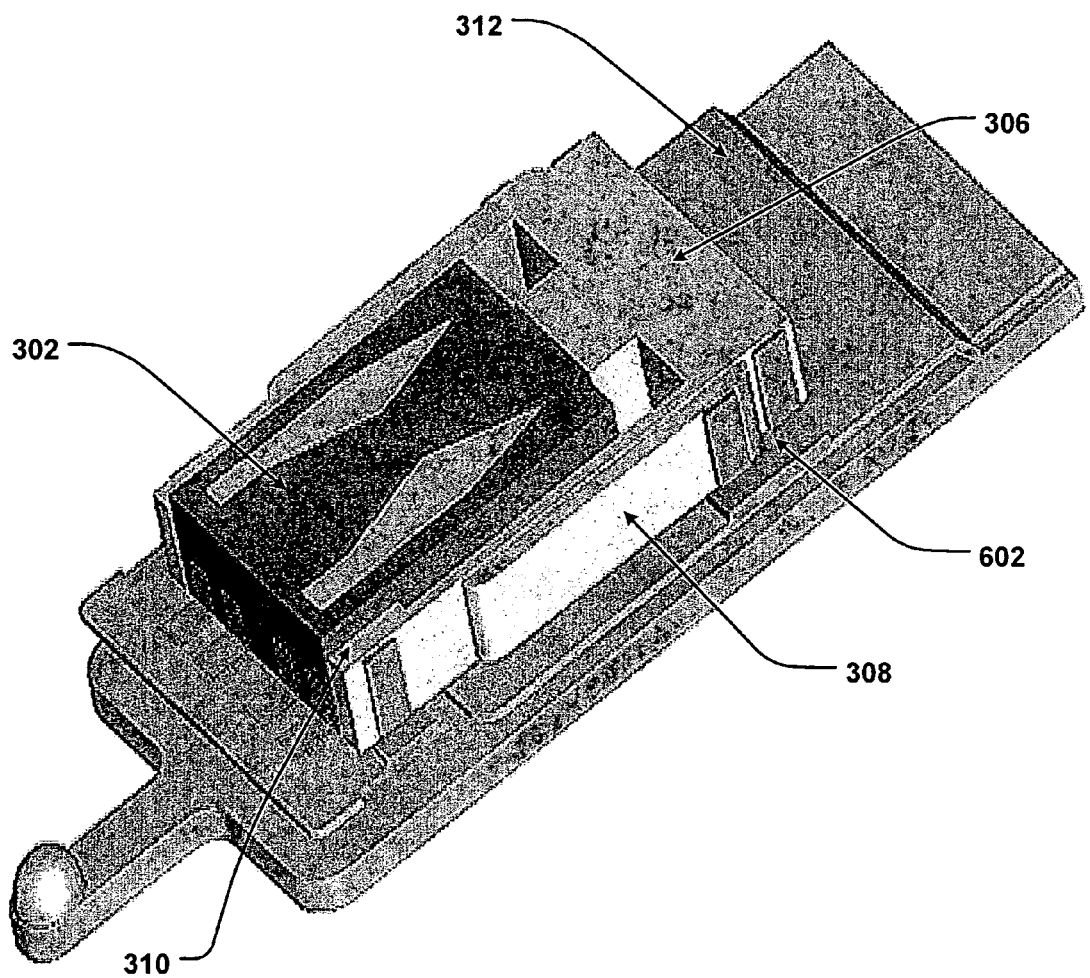
FIG. 6 provides an illustration of a step suspension according to an embodiment of the present invention.

In a further embodiment of the present invention, a step configuration is implemented to further support the micro-actuator. The step configuration further reduces the amount of contact between the slider and the suspension during movement of the actuator. In one embodiment, the step configuration is implemented using a metal step 602 in the suspension tongue 312, as shown in FIG. 6. In one embodiment, the step 602 is molded into the suspension tongue 312 at formation. In an alternate embodiment, a separate step piece 602 is coupled to the suspension tongue 312 before coupling the micro-actuator 306 to the suspension element 312. In one embodiment, the material for the step 602 is made of polyester, polyethylene, polymer, or ceramic. In a further embodiment, the step 602 is coupled to the suspension tongue 312 by epoxy, resin, anisotropic conductor film, or anisotropic conductive adhesive.

Figure 7:
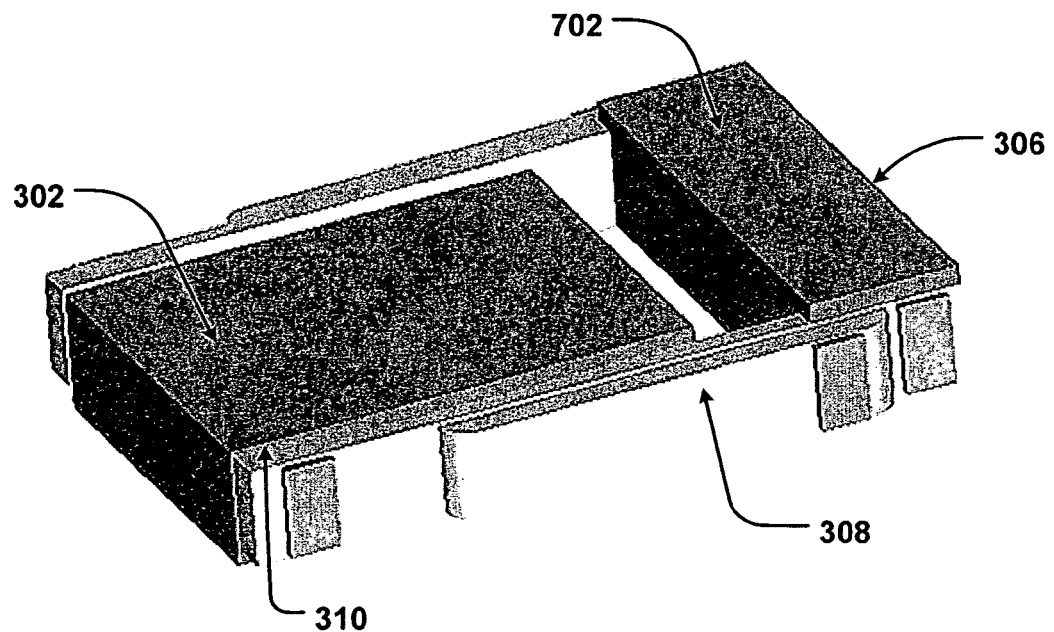
FIG. 7 provides an illustration of step actuator according to an embodiment of the present invention.

In one embodiment, the base of the micro-actuator 306 is thickened to create a step 702, as shown in FIG. 7. The base step 702 of the micro-actuator 306 separates the micro-actuator 306 from the suspension 312 and maintains a parallel gap even during changes of temperature and humidity. In an alternate embodiment, the step 702 is created by attaching a separate step plate to the base of the micro-actuator 306. In one embodiment, the step configuration includes a first step element coupled to the micro-actuator and a second step element coupled to the suspension element. In an alternate embodiment, the step configuration includes a first step element created by thickening the base of the micro-actuator and a second step element is molded into the suspension tongue. In a further embodiment, the step 602 is coupled to the micro-actuator element 312 by epoxy, resin, anisotropic conductor film, or anisotropic conductive adhesive.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. An actuator, comprising: an actuator element physically supported by and coupled to a suspension element at at least one application site of a bonding agent, the bonding agent covered by a coating application, wherein the actuator element is a micro-actuator.

2. The actuator of claim 1, wherein the micro-actuator is selected from a group consisting off a piezoelectric micro-actuator, an electromagnetic micro-actuator, an electrostatic micro-actuator, a capacitive micro-actuator, a fluidic micro-actuator, or a thermal micro-actuator.

3. The actuator of claim 1, wherein the bonding agent is a silver paste.

4. The actuator of claim 1, wherein the coating application has a glass transition temperature greater than 120 degrees Celsius.

5. The actuator of claim 1, wherein the coating application has a Young's modulus greater than 0.6 G Pa.

6. The actuator of claim 1, wherein the coating application is an epoxy agent.

7. The actuator of claim 6, wherein the epoxy agent contains a filler ingredient.

8. The actuator of claim 7, wherein the filler ingredient is selected from a group consisting of metal, glass, or a fiber material.

9. The actuator of claim 1, further comprising a step element to maintain a parallel spatial relationship between the actuator element and the suspension element.

10. The actuator of claim 9, wherein the step element is created by thickening a portion of the actuator element.

11. The actuator of claim 9, wherein the step element is coupled to a portion of the actuator element.

12. A system, comprising:
an actuator element;
a suspension element coupled to and supporting the actuator element by at least one application site of a bonding agent, the bonding agent covered by a coating application wherein the bonding agent is a silver paste.

13. The system of claim 12, further comprising a magnetic head element coupled to the suspension element by at least one application site of a bonding agent, the bonding agent covered by a coating application.

14. The system of claim 12, wherein the actuator element is selected from a group consisting of a piezoelectric micro-actuator, an electromagnetic micro-actuator, an electrostatic micro-actuator, a capacitive micro-actuator, a fluidic micro-actuator, or a thermal micro-actuator.

15. The system of claim 14, wherein the micro-actuator is a piezoelectric micro-actuator.

16. The system of claim 12, further comprising a slider element coupled to the actuator element.

17. The system of claim 12, further comprising a hard drive to be read by the slider element.

18. The system of claim 12, wherein the coating application has a glass transition temperature greater than 120 degrees Celsius.

19. The system of claim 12, wherein the coating application has a Young's modulus greater than 0.6 G Pa.

20. The system of claim 12, wherein the coating application is an epoxy agent.

21. The system of claim 20, wherein the epoxy agent contains a filler ingredient.

22. The system of claim 21, wherein the filler ingredient is selected from a group consisting of metal, glass, or a fiber material.

23. The system of claim 12, further comprising a first step element to maintain a parallel spatial relationship between the actuator element and the suspension element.

24. The system of claim 23, wherein the first step element is created by thickening a portion of the actuator element.

25. The system of claim 24, wherein a second step element is molded into the suspension element.

26. The system of claim 23, wherein the first step element is coupled to a portion of the actuator element.

27. The system of claim 26, wherein a second step element is coupled to a portion of the suspension element.

28. The system of claim 23, wherein the first step element is molded into the suspension element.

29. The system of claim 23, wherein the first step element is coupled to a portion of the suspension element.

30. The system of claim 23, wherein the first step element is coupled to a portion of the suspension element using one of a group of materials comprising epoxy, resin, anisotropic conductive film, and anisotropic conductive adhesive.

31. The system of claim 23, wherein the first step element is coupled to a portion of the micro-actuator element using one of a group of materials comprising epoxy, resin, anisotropic conductive film, and anisotropic conductive adhesive.

32. An actuator, comprising: an actuator element physically supported by and coupled to a suspension element at least one application site of a bonding agent, the bonding agent covered by a coating application further comprising a step element to maintain a parallel spatial relationship between the actuator element and the suspension element.

33. The actuator of claim 32, wherein the actuator element is a micro-actuator.

34. The actuator of claim 33, wherein the micro-actuator is selected from a group consisting of a piezoelectric micro-actuator, an electromagnetic micro-actuator, an electrostatic micro-actuator, a capacitive micro-actuator, a fluidic micro-actuator, or a thermal micro-actuator.

35. The actuator of claim 32, wherein the bonding agent is a silver paste.

36. The actuator of claim 32, wherein the coating application has a glass transition temperature greauer than 120 degrees Celsius.

37. The actuator of claim 32, wherein the coating application has a Young's modulus greater than 0.6 G Pa.

38. The actuator of claim 32, wherein the coating application is an epoxy agent.

39. The actuator of claim 38, wherein the epoxy agent contains a filler ingredient.

40. The actuator of claim 39, wherein the filler ingredient is selected from a group consisting of metal, glass, or a fiber material.

41. The actuator of claim 32, wherein the step element is created by thickening a portion of the actuator element.

42. The actuator of claim 32, wherein the step element is coupled to a portion of the actuator element.

* * * * *